United States Patent
Patton et al.

(10) Patent No.: US 7,200,650 B2
(45) Date of Patent: Apr. 3, 2007

(54) METHOD AND DEVICE AVATAR SYSTEM FOR PROVIDING AN ELECTRONIC SERVICE FOR AN ELECTRONIC DEVICE

(75) Inventors: Charles M Patton, Eugene, OR (US); Stephen A Loughran, Corvallis, OR (US); Rajeev K Pandey, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 944 days.

(21) Appl. No.: 10/028,808

(22) Filed: Dec. 21, 2001

(65) Prior Publication Data

US 2003/0120761 A1    Jun. 26, 2003

(51) Int. Cl.
G06F 15/177 (2006.01)

(52) U.S. Cl. .................. 709/222; 709/209; 709/321; 710/72; 707/1

(58) Field of Classification Search .............. 709/220, 709/222, 209, 321; 710/1, 10, 72; 703/24, 703/27; 719/321; 707/1
See application file for complete search history.

(56) References Cited

U.S. PATENT DOCUMENTS 5,949,977 A    9/1999    Hernandez
6,052,750 A *  4/2000   Lea ........................... 710/72
6,359,892 B1   3/2002   Szlam
6,968,307 B1 * 11/2005  Chrysanthakopoulos ..... 703/27
2001/0038392 A1 11/2001 Humpleman et al.
2001/0039587 A1 11/2001 Uhler et al.

OTHER PUBLICATIONS http://www.e-speak.hp.com/media/product_brief.pdf; "HP Web Services—Changing The Way Businesses Interact"; Aug. 2001.
http://www.e-speak.net/overview.html; "E-Speak Overview"; Nov. 5, 2001.
European Search Report for Application No. EP 02797352.8. Report issued Oct. 2, 2006.

* cited by examiner

*Primary Examiner*—Jeffrey Pwu

(57) ABSTRACT

The present invention includes a method and a device avatar system for providing at least one electronic service for a first physical electronic device associated with a first device avatar. In the system, an avatar hosting infrastructure includes at least the first device avatar and provides an encapsulated autonomous system that facilitates communication between the first device avatar and the first physical electronic device. The first device avatar, coupled to receive at least communications from a first controller, provides the at least one electronic service to the first physical electronic device. The first controller, coupled to the first device avatar, enables an owner to implement the at least one electronic service for the first physical electronic device. The first physical electronic device is coupled to the first device avatar and operates in a predetermined fashion in accordance with the at least one electronic service.

15 Claims, 7 Drawing Sheets

METHOD AND DEVICE AVATAR SYSTEM FOR PROVIDING AN ELECTRONIC SERVICE FOR AN ELECTRONIC DEVICE

CROSS REFERENCE TO RELATED APPLICATIONS

The present invention is related to patent applications docket numbers 10013492 and 10013446, by the same inventors, Charles M. Patton, Stephen A. Loughran, and Rajeev K. Pandey, being filed contemporaneously with the present application.

FIELD OF THE INVENTION

The invention relates generally to a collection of electronic services remotely linked to an electronic device, and more particularly, to the structure and operation of the collection of electronic services that may be coupled to the electronic device.

BACKGROUND OF THE INVENTION

In the past when a user purchased an electronics device, the user simply took it home and used it as it was. Usually there was a registration form inside the package for the device, so that the owner could register his ownership with the manufacturer. This activity was a voluntary measure that the owner could perform, but it was not generally required. If assistance with the device was needed at a later date, the manufacturer usually asked the purchaser to identify the device by looking in a particular location on the device and reading off its own particular ID. Then the manufacturer proceeded to give the purchaser the assistance needed.

In contrast, particularly if a purchaser makes a software purchase at an Internet site and takes ownership of a virtual device such as a personal web site, email account or even software he has bought and has possession of, the owner-to-be may be required to go through a registration process. Such a process almost inevitably ties the owner permanently to the virtual device. Thus, when the software or the like is transferred to another owner, the transfer of ownership is not as simple as the transfer of ownership of a physical device. In some cases, the new owner may not be able to obtain a transfer of registration.

As more devices are being developed that utilize more and more remotely located software, there is a need for organizing and collecting electronic services in a remote location so that the services may readily be accessed and utilized by a physical device associated with the remote services. Thus, there is a need for a collection of organized electronic services that may readily be coupled remotely with a physical device to facilitate communication of the physical device with the remote electronic service provider.

SUMMARY OF THE INVENTION

The present invention encompasses an avatar method and apparatus that provides hosting of at least one of a plurality of electronic services logically and substantially permanently associated with a first remote electronic device wherein the at least one of the plurality of electronic services is operated on behalf of the first remote electronic device. An electronic data processing apparatus includes a first device avatar that is coupled to a first control unit and to the first remote electronic device. The first device avatar includes at least a first memory coupled to a first processor that implements the at least one of the plurality of electronic services on behalf of the first remote electronic device in accordance with signals from the first control unit.

BRIEF DESCRIPTION OF THE DRAWINGS

The foregoing advantages and features of the invention will become apparent upon reference to the following detailed description and the accompanying drawings, of which.

DETAILED DESCRIPTION OF THE EMBODIMENTS

Figure 1:
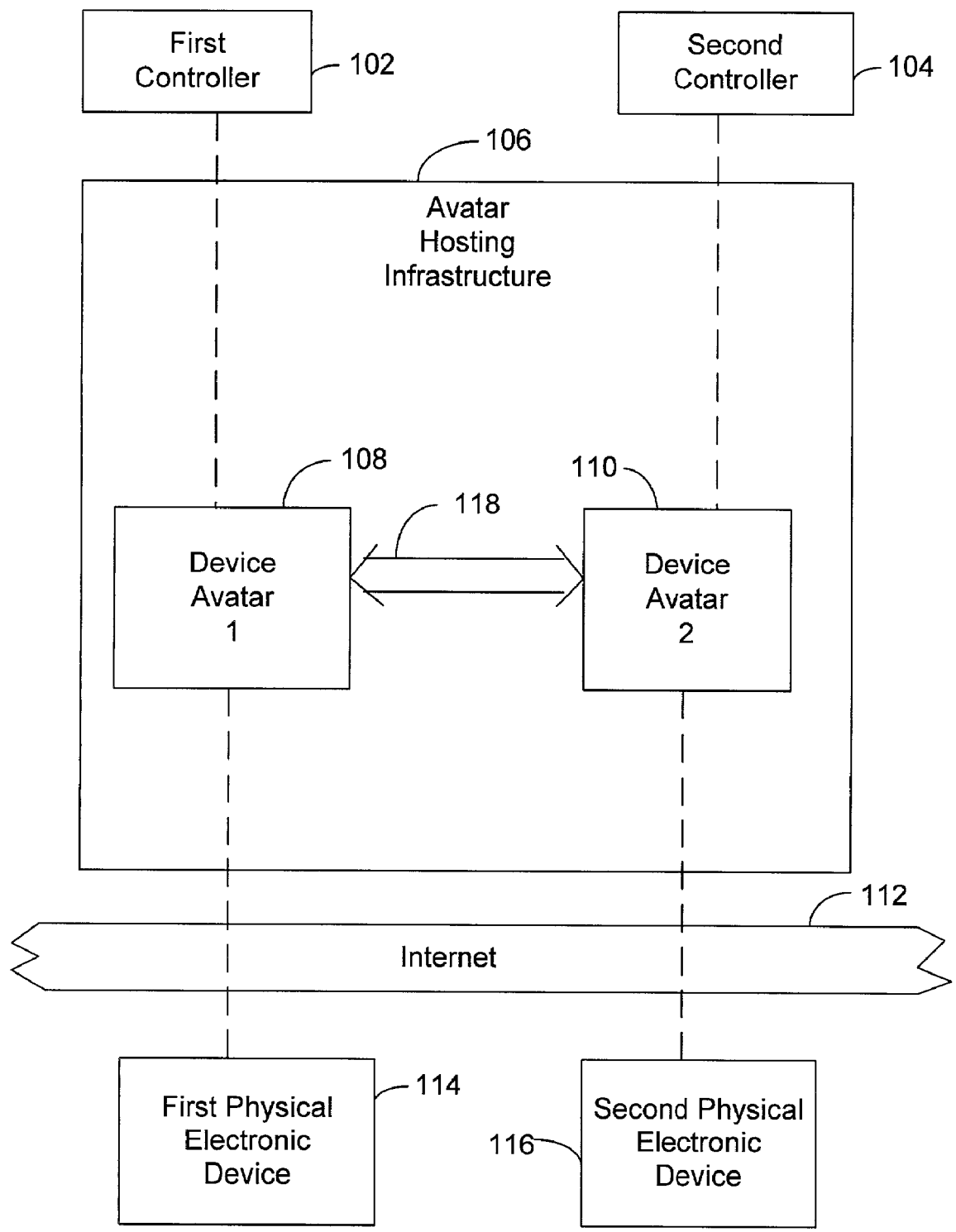
FIG. 1 is a block diagram of one embodiment of a device avatar system in accordance with the present invention.

The present invention provides a substantially permanently attached and maintained virtual device for each electronic device and provides for the owner of the electronic device to employ electronic services via the virtual device avatar system. For the purposes of this patent, a device avatar is defined as a coherent collections of electronic services in which the collection is substantially permanently and logically attached to a remote electronic device such as, for example, an electronic printer, an electronic camera, a scanner, a computer, a personal digital assistant, test or measurement apparatus or the like. In this manner, a coherent collection of electronic services is substantially permanently made available to a remote electronic device via a logical connection. For example, a camera may utilize a printer to print its pictures wherein the camera communicates via the Internet with an avatar associated with the camera, the camera's avatar communicates with the printer's avatar, the printer's avatar communicates with the printer via the Internet, and the printer carries out the service of printing out pictures from the camera.

The present invention includes a device avatar system and method for providing at least one electronic service for a first physical electronic device that is associated with a first device avatar utilizing at least one channel of electronic communication. The system includes an avatar hosting infrastructure that has disposed therein at least the first device avatar. The avatar hosting infrastructure provides an encapsulated autonomous system for facilitating communication between the first device avatar and the first physical electronic device. The first device avatar is coupled to receive at least communications from a first controller and operates to provide the at least one electronic service to the first physical electronic device. The first controller is coupled to the first device avatar and enables an owner of the associated physical electronic device to utilize the at least one electronic service for the first physical electronic device. The first physical electronic device is coupled to the first device avatar and operates in a predetermined fashion in accordance with the at least one electronic service.

In another embodiment, an avatar hosting infrastructure provides at least one of a plurality of electronic services logically and substantially permanently associated with a first remote electronic device wherein the at least one of the plurality of electronic services is operated on behalf of the first remote electronic device. In this embodiment, the avatar hosting infrastructure includes an electronic data processing apparatus with a first device avatar that is coupled to a first control unit and to the first remote electronic device. The first device avatar includes at least a memory that is coupled to a processing unit that implements the at least one of the plurality of electronic services on behalf of the first remote electronic device in accordance with signals from the first control unit. Typically, the first remote electronic device is coupled to the first device avatar via the Internet.

In one embodiment, the method of the present invention provides for implementing at least one of a plurality of electronic services logically and substantially permanently associated with a first remote electronic device wherein the at least one of the plurality of electronic services is operated on behalf of the first remote electronic device using a logical channel of communication. The method includes the steps of connecting to a device avatar, by an apparent owner, via a Controller Listener; issuing, by the apparent owner, a challenge to the device avatar; accessing, by the device avatar, from a Controller Key Storage via a Controller State Machine, an owner key and using a Challenge Generator to generate a challenge of the apparent owner; issuing a successful response, by the apparent owner, to the challenge by the device avatar; and issuing, by the device avatar, a response to the challenge of the apparent owner by the Controller State Machine using a Response Generator and a device key in the Controller Key Storage to indicate that the connection is approved for a correct device avatar.

In another embodiment, the method of the present invention provides for implementing at least one of a plurality of electronic services logically and substantially permanently associated with a first remote apparent electronic device wherein the at least one of the plurality of electronic services is operated on behalf of the first remote apparent electronic device using a logical channel of communication. The method includes the steps of connecting to a device avatar, by an apparent electronic device, via a Device Listener; issuing, by the apparent electronic device, a challenge to the device avatar; accessing, by the device avatar, from a Device Key Storage via a Device-specific State Machine, a device key and using a Challenge Generator to generate a challenge of the apparent electronic device; issuing a successful response, by the apparent electronic device, to the challenge by the device avatar; and issuing, by the device avatar, a response to the challenge of the apparent electronic device by the Device-specific State Machine using a Response Generator and a device key in the Device Key Storage to indicate that the connection is approved for a correct device avatar.

In another embodiment, the method of the present invention provides for implementing, via a second device avatar in fulfillment of a contract for services previously issued by a first device avatar, at least one of a plurality of electronic services logically and substantially permanently associated with a first remote electronic device wherein the at least one of the plurality of electronic services is operated on behalf of the first remote electronic device using a logical channel of communication. The method includes the steps of connecting to the first device avatar, by a remote entity, via a Service Listener in preparation for fulfilling the contract for services previously issued by the first device avatar; issuing, by the remote entity, a challenge to the first device avatar based on an issuer's key included in the contract; examining, by a Contract Interpreter, the contract to verify the contract's applicability by comparing at least an expiration time with a current time referring to a Clock and a number of valid invocations remaining; providing a response, by the Contract Interpreter, to the challenge to the first device avatar; and carrying out terms of the contract, by the Contract Interpreter, by invoking acquired behaviors in a number, order and manner specified by the contract and as resident in a Store of Acquired Behaviors. For example, the remote entity may be a second device avatar.

In another embodiment, the method of the present invention provides for implementing, via a recipient device avatar in fulfillment of a contract for services previously issued by an issuer device avatar, at least one of a plurality of electronic services logically and substantially permanently associated with a first remote electronic device wherein the at least one of the plurality of electronic services is operated on behalf of the first remote electronic device using a logical channel of communication. The method includes the steps of initiating, by the recipient device avatar, communications to a Services Listener of the issuer device avatar specified in the contract; issuing, by the recipient device avatar, a challenge to the issuer device avatar based on an issuer device avatar key included in the contract; responding, by the recipient device avatar, to the challenge of the issuer device avatar based on a recipient device avatar key included in the contract; and implementing, by the recipient device avatar, at least one electronic service in accordance with the contract. The method may further include, prior to initiating, by the recipient device avatar, communications to a Services Listener of the issuer device avatar specified in the contract, a step of outsourcing the contract to an outsource and invoking, by the outsource, the contract by outsourcing, to the recipient device avatar, the response to the issuer.

As shown in FIG. 1, the present invention may be embodied in a device avatar system that provides at least one electronic service for a first physical electronic device 114. In the system, the first physical electronic device 114 is associated with a first device avatar 108 using at least one channel of logical electronic communication, such as, for example, via the Internet 112. An avatar hosting infrastructure 106 includes therein at least the first device avatar 108, which is utilized for providing an encapsulated autonomous system that facilitates communication between the first device avatar 108 and the first physical electronic device 114. The first device avatar 108 is coupled to receive at least communications from a first controller 102. The first device avatar 108 provides the at least one electronic service to the first physical electronic device 114. The first controller 102 is coupled to the first device avatar 108 and is arranged to operate to permit an owner of the associated physical electronic device (first physical electronic device 114) to implement the at least one electronic service for the first physical electronic device.

The first physical electronic device 114 is coupled to the first device avatar 108, and is used for operating in a predetermined fashion in accordance with the at least one electronic service. The first physical electronic device communicates using electronic communications that may, as desired, be bi-directional, outbound unidirectional, or inbound unidirectional. As note above, where desired, the first physical electronic device 114 may be coupled to the first device avatar 108 via the Internet 112. A second device avatar 110 may be coupled to a second physical electronic device 116 and may receive communications from a second controller 104 so that at least one electronic service associated with the second physical electronic device 116 may be provided to the first physical electronic device 114.

The first physical electronic device 114 may, for example, be a camera, a scanner, measurement equipment, a personal digital assistant, a computer, or the like. For example, the second physical electronic device 116 may be a printer or a display screen.

In one embodiment, the avatar hosting infrastructure 106 may be an independent electronic data processing apparatus, or alternatively, may include secured partitions for each physical electronic device within an electronic data processing apparatus.

Figure 2:
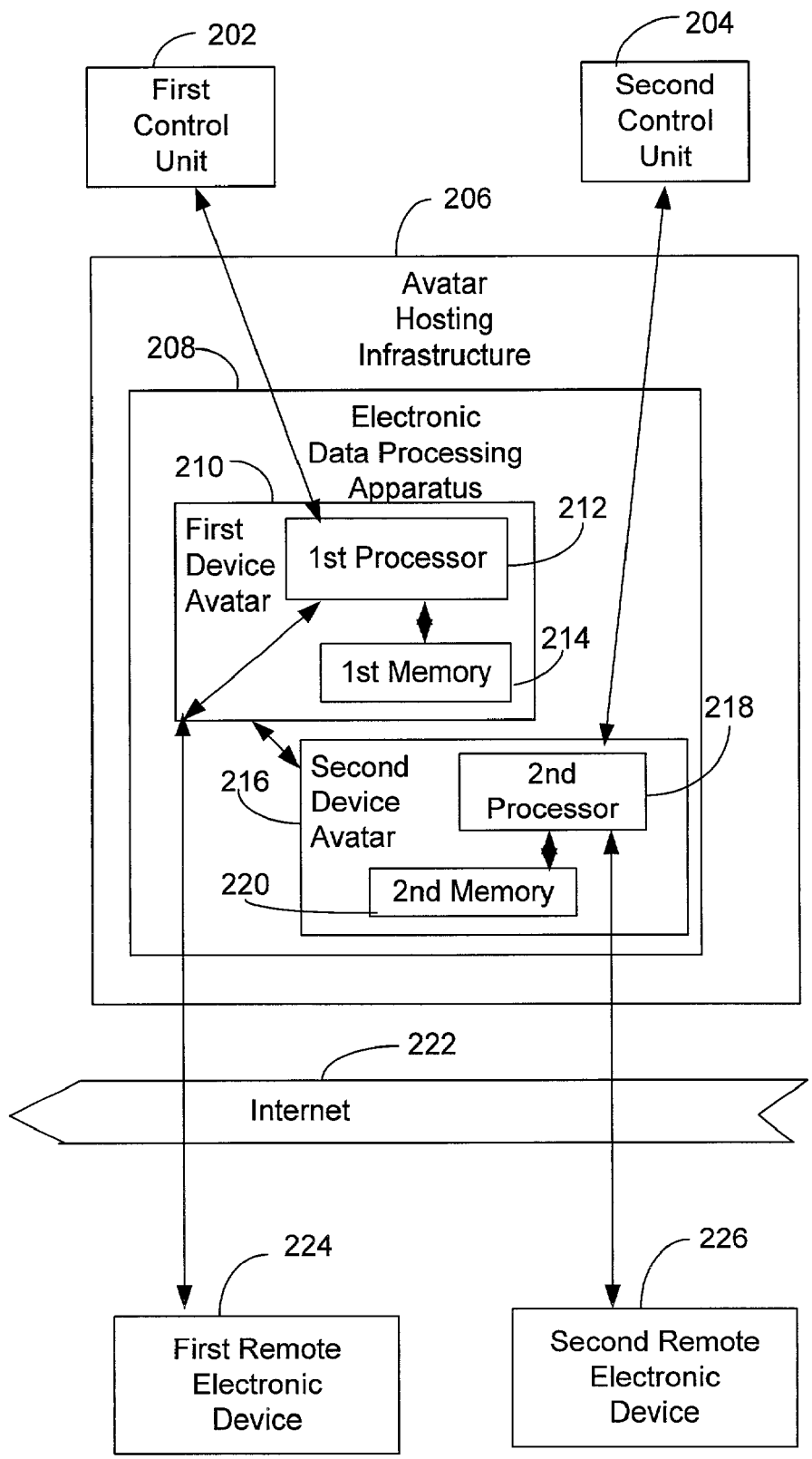
FIG. 2 is a block diagram of one embodiment of another device avatar system in accordance with the present invention.

FIG. 2 shows a block diagram of another embodiment of a device avatar system in accordance with the present invention. An avatar hosting infrastructure 206 provides at least one of a plurality of electronic services logically and substantially permanently associated with a first remote electronic device 224 wherein the at least one of the plurality of electronic services is operated on behalf of the first remote electronic device 224. The avatar hosting infrastructure 206 includes an electronic data processing apparatus 208 that has a first device avatar 210 that is coupled to a first control unit 202 and to the first remote electronic device 224. The first device avatar 210 includes at least a first memory 214 coupled to a processor 212 that implements the at least one of the plurality of electronic services on behalf of the first remote electronic device 224 in accordance with signals from the first control unit 202. The first remote electronic device 224 may, for example, be coupled to the first device avatar 210 via the Internet 222. The electronic data processing apparatus 208 may further include a second device avatar 216, coupled to a second remote electronic device 226 and to receive communications from a second control unit 204 The second device avatar 216 includes a second processor 218 coupled to a second memory and operates to provide an electronic service associated with the second remote electronic device 226 to the first remote electronic device 224. The first remote electronic device 224 may, for example, be a camera, a scanner, measurement equipment, a personal digital assistant, a computer, or the like. The second remote electronic device 226 may, for example, be a printer or a display screen. Where desired, the avatar hosting infrastructure 206 may include secured partitions for each remote electronic device within the electronic data processing apparatus. The electronic services may be implemented bi-directionally, outbound uni-directionally from the avatar hosting infrastructure, or inbound uni-directionally to the avatar hosting infrastructure.

Figure 3:
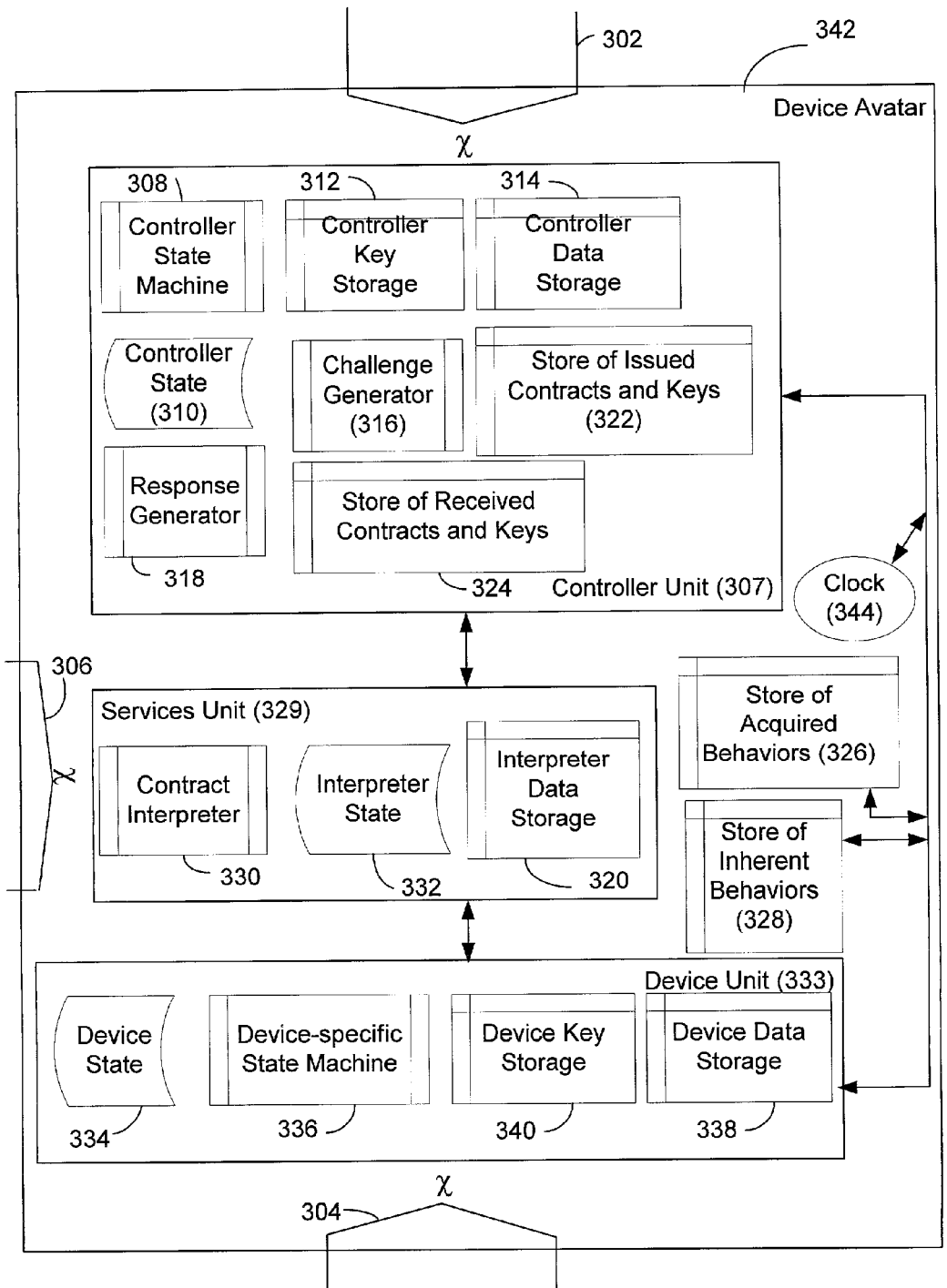
FIG. 3 shows a block diagram of one example of three logical channels of communication of a device avatar that may be used for listening for incoming connections in accordance with the present invention.

As shown in FIG. 3, generally, three logical channels of communication for the device avatar 342 may be used for listening for incoming connections: the Controller Listener 302, the Device Listener 304, and the Services Listener 306. All units within each of the three logical channels are coupled to one another (not shown). The Listeners (controller Unit 307, Services Unit 329 and Device Unit 333) are coupled to one another and to a clock 344, a Store of Acquired Behaviors 326 and a Store of Inherent Behaviors 328 and operate independently from one another, though each may serialize their own connections, i.e., allow only one connection to be active at a time. In a preferred embodiment, all three channels operate by the rules of the Hypertext Transport Protocol (HTTP) or the Secure Hypertext Transport Protocol (HTTPS). FIGS. 4–7 show various embodiments of implementing the method of the present invention utilizing the units shown in FIG. 3 for the device avatar 342.

Figure 4:
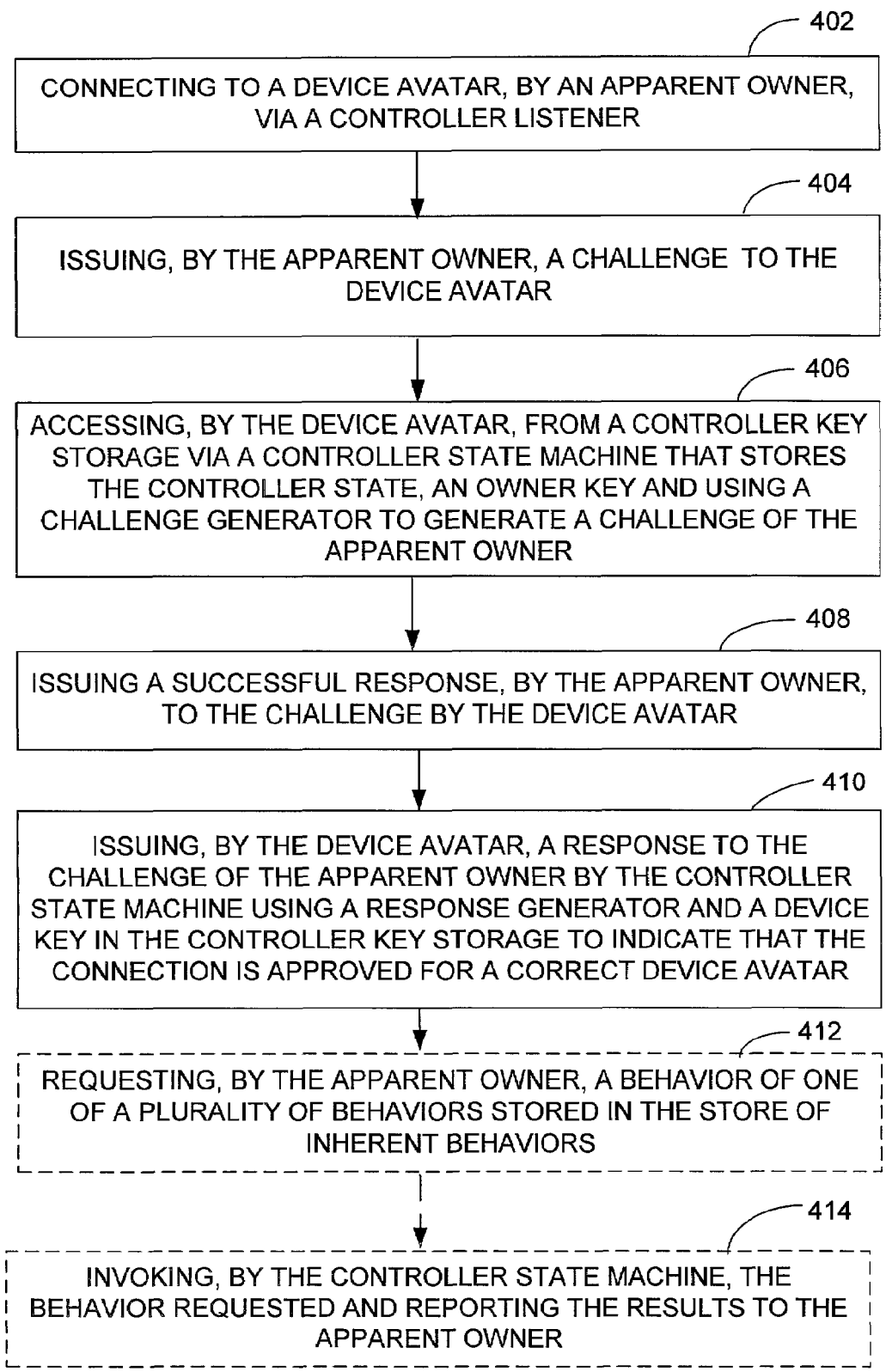
FIGS. 4–7 show various embodiments of implementing the method of the present invention utilizing the units shown in FIG. 3 for the device avatar.

FIG. 4 is a flow chart showing one embodiment of steps for a method in accordance with the present invention for implementing at least one of a plurality of electronic services logically and substantially permanently associated with a first remote electronic device wherein the at least one of the plurality of electronic services is operated on behalf of the first remote electronic device using a logical channel of communication. The steps include: connecting 402 to a device avatar, by an apparent owner, via a Controller Listener 302; issuing 404, by the apparent owner, a challenge to the device avatar 342; accessing 406, by the device avatar 342, from a Controller Key Storage 312 via a Controller State Machine 308 that stores the Controller State 310, an owner key and using a Challenge Generator 316 to generate a challenge of the apparent owner; issuing 408 a successful response, by the apparent owner, to the challenge by the device avatar 342; and issuing 410, by the device avatar 342, a response to the challenge of the apparent owner by the Controller State Machine 308 using a Response Generator 318 and a device key in the Controller Key Storage 312 to indicate that the connection is approved for a correct device avatar. The method may further include requesting 412, by the apparent owner, a behavior of one of a plurality of behaviors stored in the Store of Inherent Behaviors 328, and invoking 414, by the Controller State Machine 308, the behavior requested and reporting results to the apparent owner. The Inherent Behaviors typically may not be configured to disclose or alter a private key of the device avatar 342. Generally, the Inherent Behaviors include updating an apparent owner key in the Controller Key Storage 312, updating a contents of a Store of Acquired Behaviors 326, receiving and listing received contracts wherein a Store of Received Contracts and Keys 324 is maintained, listing issued contracts wherein a Store of Issued Contracts and Keys 322 is maintained, invoking an acquired behavior from the Store of Acquired Behaviors 326, manipulating Controller Data Storage 314, manipulating Device Data Storage 338, manipulating Interpreter Data Storage 320, monitoring a Device State 334 using a Device-specific State machine 336, resetting the Device State 334, monitoring an Interpreter State 332, and resetting the Interpreter State 332.

Figure 5:
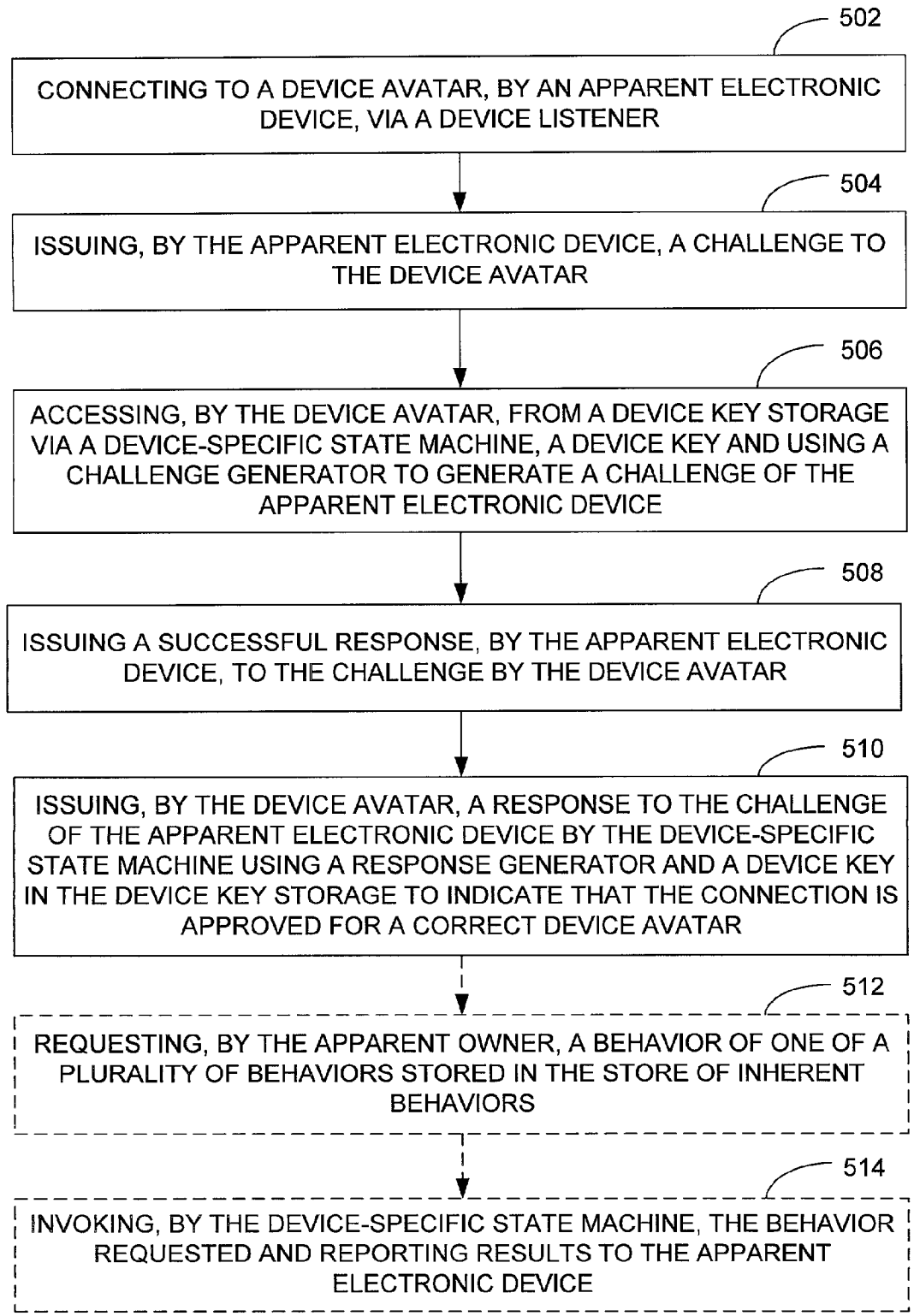

FIG. 5 is a flow chart showing steps for another embodiment for a method for implementing at least one of a plurality of electronic services logically and substantially permanently associated with a first remote apparent electronic device wherein the at least one of the plurality of electronic services is operated on behalf of the first remote apparent electronic device using a logical channel of communication. The method includes the steps of connecting 502 to a device avatar 342, by an apparent electronic device, via a Device Listener 304; issuing 504, by the apparent electronic device, a challenge to the device avatar 342; accessing 506, by the device avatar 342, from a Device Key Storage 340 via a Device-specific State Machine 336, a device key and using a Challenge Generator 316 to generate a challenge of the apparent electronic device; issuing 508 a successful response, by the apparent electronic device, to the challenge by the device avatar 342; and issuing 510, by the device avatar 342, a response to the challenge of the apparent electronic device by the Device-specific State Machine 336 using a Response Generator 318 and a device key in the Device Key Storage 340 to indicate that the connection is approved for a correct device avatar. The method may further include requesting 512, by the apparent owner, a behavior of one of a plurality of behaviors stored in the Store of Inherent Behaviors 328, and invoking 514, by the Device-specific State Machine 336, the behavior requested and reporting results to the apparent electronic device. Inherent Behaviors may include: reporting to the apparent electronic device an action it is requested to perform; accepting status information for the apparent electronic device; sending data to the device from a Device Data Storage 338; and receiving data from the apparent electronic device into the Device Data Storage 338.

Figure 6:
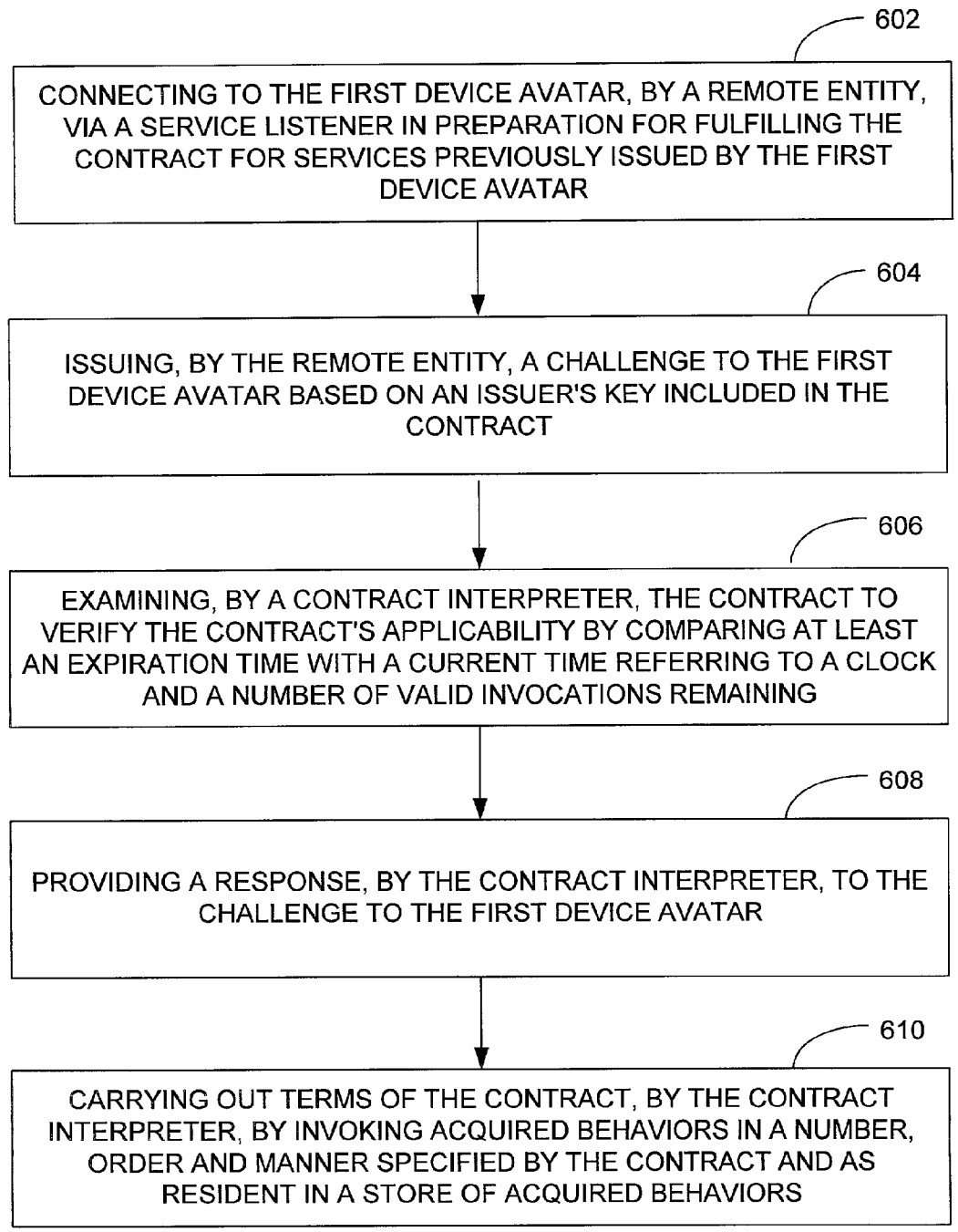

FIG. 6 is a flow chart showing steps for another embodiment of the method for implementing, via a second device avatar in fulfillment of a contract for services previously issued by a first device avatar, at least one of a plurality of electronic services logically and substantially permanently associated with a first remote electronic device wherein the at least one of the plurality of electronic services is operated on behalf of the first remote electronic device using a logical channel of communication. The steps include connecting 602 to the first device avatar, by a remote entity, via a Service Listener 306 in preparation for fulfilling the contract for services previously issued by the first device avatar; issuing 604, by the remote entity, a challenge to the first device avatar based on an issuer's key included in the contract; examining 606, by a Contract Interpreter 330, the contract to verify the contract's applicability by comparing at least an expiration time with a current time referring to a Clock 344 and a number of valid invocations remaining; providing 608 a response, by the Contract Interpreter 330, to the challenge to the first device avatar; and carrying out 610 terms of the contract, by the Contract Interpreter 330, by invoking acquired behaviors in a number, order and manner specified by the contract and as resident in a Store of Acquired Behaviors 326. In one embodiment, the remote entity may be a second device avatar. The contract may include primatives that include at least one of: control structures, logical and arithmetic operations and acquired behaviors whose identities are referenced in the contract without internal structures. The acquired behaviors may include a restricted set of inherent behaviors that include at least: sending data to the remote entity from an Interpreter Data Storage 320; receiving data from the remote entity into the Interpreter Data Storage 320; and invoking a received contract.

Figure 7:
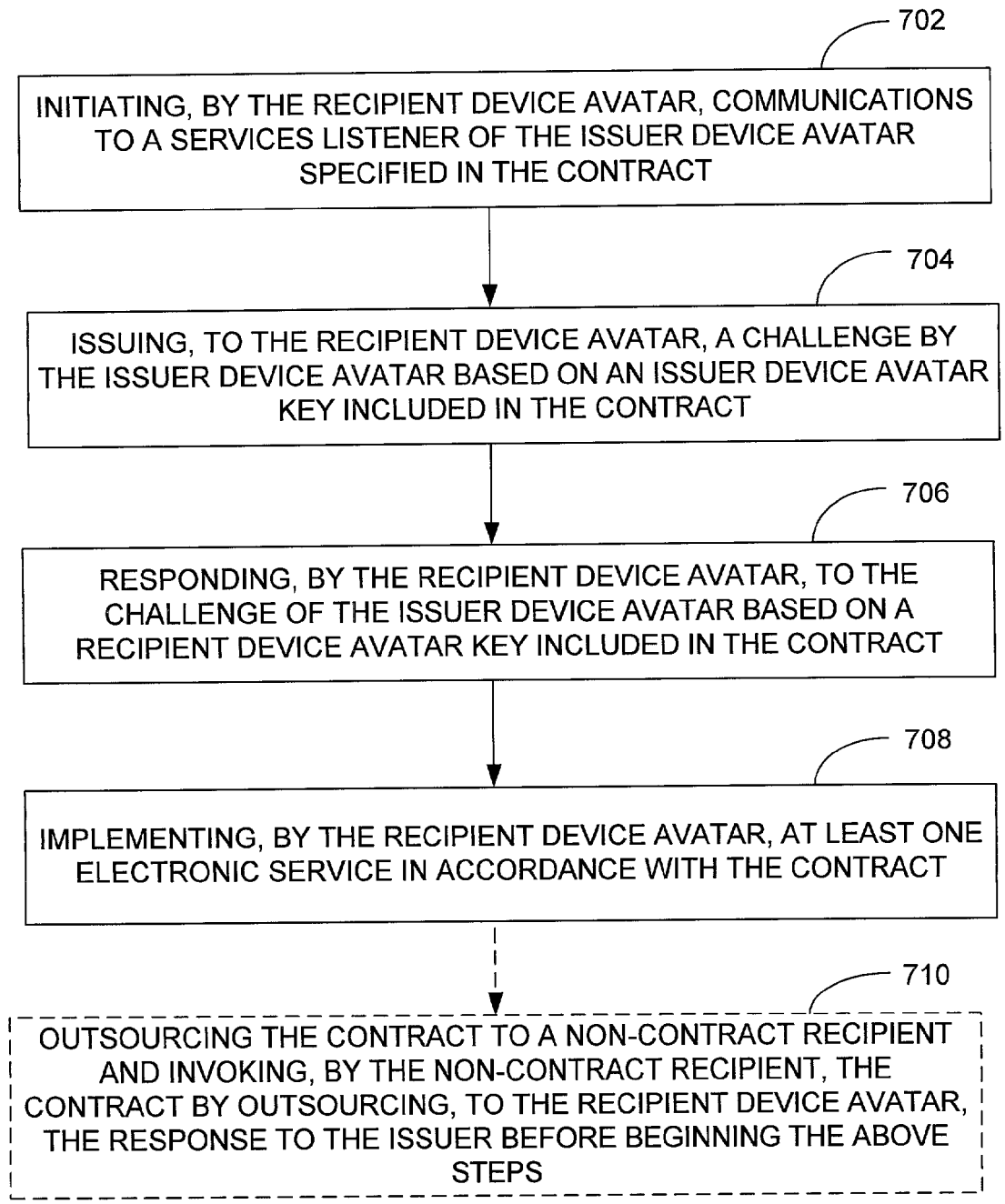

FIG. 7 is a flow chart showing steps of another embodiment for the method for implementing, via a recipient device avatar in fulfillment of a contract for services previously issued by an issuer device avatar, at least one of a plurality of electronic services logically and substantially permanently associated with a first remote electronic device wherein the at least one of the plurality of electronic services is operated on behalf of the first remote electronic device using a logical channel of communication. The method includes the steps of initiating 702, by the recipient device avatar, communications to a Services Listener 306 of the issuer device avatar specified in the contract; issuing 704, to the recipient device avatar, a challenge by the issuer device avatar based on an issuer device avatar key included in the contract; responding 706, by the recipient device avatar, to the challenge of the issuer device avatar based on a recipient device avatar key included in the contract; and implementing 708, by the recipient device avatar, at least one electronic service in accordance with the contract. The method may further include, prior to initiating, by the recipient device avatar, communications to a Services Listener 306 of the issuer device avatar specified in the contract, a step of outsourcing 710 the contract to a non-contract recipient and invoking, by the non-contract recipient, the contract by outsourcing, to the recipient device avatar, the response to the issuer before beginning the above steps.

Thus, a system, device avatar and methods are described for implementing at least one of a plurality of electronic services logically and substantially permanently associated with a remote electronic device wherein the at least one of the plurality of electronic services is operated on behalf of the remote electronic device using a logical channel of communication in accordance with the present invention. Many modifications and variations may be made to the techniques and structures described and illustrated herein without departing from the spirit and scope of the invention. Accordingly, it should be understood that the system, device avatar and methods described herein are illustrative only and are not limiting upon the scope of the invention.

What is claimed is:

1. A device avatar system for providing at least one electronic service for a first physical electronic device associated with a first device avatar using at least one channel of electronic communication, the system comprising:

an avatar hosting infrastructure, having disposed therein at least the first device avatar, for providing an encapsulated autonomous system for facilitating communication between the first device avatar and the first physical electronic device;

the first device avatar, coupled to receive at least communications from a first controller, for providing the at least one electronic service to the first physical electronic device;

the first controller, coupled to the first device avatar, for an owner of the associated physical electronic device to implement the at least one electronic service for the first physical electronic device, wherein the first controller accesses, by way of the device avatar, from a controller key storage, an owner key and uses a challenge generator to generate a challenge of the owner; and the first physical electronic device, coupled to the first device avatar, for operating in a predetermined fashion in accordance with the at least one electronic service.

2. The system of claim 1 wherein the first physical electronic device is coupled to the first device avatar via the Internet.

3. The system of claim 1 further including a second device avatar, coupled to a second physical electronic device and to receive communications from a second controller, for providing an electronic service associated with the second physical electronic device to the first physical electronic device.

4. The system of claim 1 wherein the first physical electronic device is one of: a camera, a scanner, measurement equipment, a personal digital assistant, and a computer.

5. The system of claim 3 wherein the second physical electronic device is one of: a printer and a display screen.

6. The system of claim 1 wherein the avatar hosting infrastructure is an independent electronic data processing apparatus.

7. The system of claim 1 wherein the avatar hosting infrastructure includes secured partitions for each physical electronic device within an electronic data processing apparatus.

8. The system of claim 1 wherein communications are one of: bi-directional, outbound unidirectional from the avatar hosting infrastructure, and inbound unidirectional to the avatar hosting infrastructure.

9. An avatar hosting infrastructure for providing at least one of a plurality of electronic services logically and substantially permanently associated with a first remote electronic device wherein the at least one of the plurality of electronic services is operated on behalf of the first remote electronic device, comprising:

an electronic data processing apparatus having a first device avatar that is coupled to a first control unit and to the first remote electronic device, wherein the first device avatar includes at least a first memory coupled to a first processor that implements the at least one of the plurality of electronic services on behalf of the first remote electronic device in accordance with signals from the first control unit, and wherein the electronic data processing apparatus accesses, by way of the device avatar, from a controller key storage, an owner key and uses a challenge generator to generate a challenge of an owner of the first remote electronic device.

10. The avatar hosting infrastructure of claim 9 wherein the first remote electronic device is coupled to the first device avatar via the Internet.

11. The avatar hosting infrastructure of claim 9 wherein the electronic data processing apparatus further includes a second device avatar, coupled to a second remote electronic device and to receive communications from a second control unit, for providing an electronic service associated with the second remote electronic device to the first remote electronic device.

12. The avatar hosting infrastructure of claim 9 wherein the first remote electronic device is one of: a camera, a scanner, measurement equipment, a personal digital assistant, and a computer.

13. The avatar hosting infrastructure of claim 11 wherein the second remote electronic device is one of: a printer and a display screen.

14. The avatar hosting infrastructure of claim 11 wherein the avatar hosting infrastructure includes secured partitions for each remote electronic device within the electronic data processing apparatus.

15. The avatar hosting infrastructure of claim 1 wherein the electronic services are implemented in one of the following directions: bi-directional, outbound unidirectional from the avatar hosting infrastructure, and inbound unidirectional to the avatar hosting infrastructure.

* * * * *

UNITED STATES PATENT AND TRADEMARK OFFICE
CERTIFICATE OF CORRECTION

PATENT NO. : 7,200,650 B2  
APPLICATION NO. : 10/028808  
DATED : April 3, 2007  
INVENTOR(S) : Charles M Patton et al.

Page 1 of 1

It is certified that error appears in the above-identified patent and that said Letters Patent is hereby corrected as shown below:

In column 4, line 61, delete "unidirectional" and insert -- uni-directional --, therefor.

In column 8, line 62, in Claim 8, delete "unidirectional" and insert -- uni-directional --, therefor.

In column 8, line 63, in Claim 8, delete "unidirectional" and insert -- uni-directional --, therefor.

In column 10, line 18, in Claim 15, delete "unidirectional" and insert -- uni-directional --, therefor.

In column 10, lines 19-20, in Claim 15, delete "unidirectional" and insert -- uni-directional --, therefor.

Signed and Sealed this

Nineteenth Day of May, 2009

JOHN DOLL  
*Acting Director of the United States Patent and Trademark Office*